United States Patent
Basson et al.

(10) Patent No.: US 8,259,992 B2
(45) Date of Patent: Sep. 4, 2012

(54) MULTIPLE AUDIO/VIDEO DATA STREAM SIMULATION METHOD AND SYSTEM

(75) Inventors: Sara H. Basson, White Plains, NY (US); Dimitri Kanevsky, Ossining, NY (US); Edward Emile Kelley, Wappingers Falls, NY (US); Bhuvana Ramabhadran, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 12/138,996

(22) Filed: Jun. 13, 2008

(65) Prior Publication Data

US 2009/0313015 A1    Dec. 17, 2009

(51) Int. Cl.
*G06K 9/00* (2006.01)
*G06F 17/00* (2006.01)

(52) U.S. Cl. ........ 382/100; 382/118; 382/181; 715/230; 715/231; 715/233

(58) Field of Classification Search .......................... None
See application file for complete search history.

(56) References Cited

U.S. PATENT DOCUMENTS

| | | | |
|---|---|---|---|
| 4,739,401 A | 4/1988 | Sacks et al. | |
| 5,227,863 A | 7/1993 | Bilbrey et al. | |
| 5,802,281 A | 9/1998 | Clapp et al. | |
| 6,931,147 B2 * | 8/2005 | Colmenarez et al. | 382/118 |
| 7,085,719 B1 | 8/2006 | Shambaugh et al. | |
| 7,607,097 B2 * | 10/2009 | Janakiraman et al. | 715/753 |
| 2003/0108241 A1 | 6/2003 | Colmenarez et al. | |
| 2004/0197750 A1 | 10/2004 | Donaher et al. | |
| 2005/0159958 A1 | 7/2005 | Yoshimura | |
| 2007/0230439 A1 | 10/2007 | Milstein et al. | |
| 2007/0277092 A1 * | 11/2007 | Basson et al. | 715/512 |
| 2007/0299888 A1 | 12/2007 | Thornton et al. | |
| 2008/0273765 A1 * | 11/2008 | Tsujimura | 382/118 |
| 2008/0275830 A1 * | 11/2008 | Greig | 706/21 |
| 2009/0297029 A1 * | 12/2009 | Cazier | 382/190 |
| 2009/0310939 A1 | 12/2009 | Basson et al. | |
| 2010/0191037 A1 | 7/2010 | Cohen et al. | |

OTHER PUBLICATIONS

Chen, L.S.; Huang, T.S.; Miyasato, T.; Nakatsu, R.; "Multimodal human emotion/expression recognition," Automatic Face and Gesture Recognition, 1998. Proceedings. Third IEEE International Conference on, Issue Date: Apr. 14-16, 1998, on pp. 366-371.*

(Continued)

*Primary Examiner* — Matthew Sked
(74) *Attorney, Agent, or Firm* — Schmeiser, Olsen & Watts; John Pivnichny

(57) ABSTRACT

A multiple audio/video data stream simulation method and system. A computing system receives first audio and/or video data streams. The first audio and/or video data streams include data associated with a first person and a second person. The computing system monitors the first audio and/or video data streams. The computing system identifies emotional attributes comprised by the first audio and/or video data streams. The computing system generates second audio and/or video data streams associated with the first audio and/or video data streams. The second audio and/or video data streams include the first audio and/or video data streams data without the emotional attributes. The computing system stores the second audio and/or video data streams.

13 Claims, 9 Drawing Sheets

OTHER PUBLICATIONS

Office Action (Mail Date Jun. 30, 2011) for U.S. Appl. No. 12/137,606, filed Jun. 12, 2008.
Pivik et al.; Using Virtual Reality to Teach Disability Awareness; J. Educational Computing Research, vol. 26(2) 2002 Baywood Publishing Co Inc.; pp. 203-218.
Amendment filed Sep. 20, 2011 in response to Office Action (Mail Date Jun. 30, 2011) for U.S. Appl. No. 12/137,606, filed Jun. 12, 2008.
Office Action (Mail Date Jan. 12, 2012) for U.S. Appl. No. 12/137,606, filed Jun. 12, 2008.

* cited by examiner

MULTIPLE AUDIO/VIDEO DATA STREAM SIMULATION METHOD AND SYSTEM

FIELD OF THE INVENTION

The present invention relates to a method and associated system for simulating, combining, and/or enhancing multiple audio/video data streams.

BACKGROUND OF THE INVENTION

Modifying multiple data files typically comprises an in efficient process with little flexibility. Accordingly, there exists a need in the art to overcome the deficiencies and limitations described herein above.

SUMMARY OF THE INVENTION

The present invention provides a method, comprising:
receiving, by a computing system, a first audio data stream, wherein said first audio data stream comprises first speech data associated with a first person;
receiving, by said computing system, a second audio data stream, wherein said second audio data stream comprises second speech data associated with a second person;
monitoring, by said computing system, said first audio data stream and said second audio data stream;
identifying, by said computing system in response to said monitoring said first audio data stream, first emotional attributes comprised by said first audio data stream;
generating, by said computing system in response to said identifying said first emotional attributes, a third audio data stream associated with said first audio data stream, wherein said third audio data stream comprises said first speech data, and wherein said third audio data stream does not comprise said first emotional attributes;
identifying, by said computing system in response to said monitoring said second audio data stream, second emotional attributes comprised by said second audio data stream;
identifying, by said computing system, a first emotional attribute of said second emotional attributes;
associating, by said computing system, a first audible portion of said second audio data stream with said first emotional attribute;
generating, by said computing system, a first audible label for said first audible portion of said second audio data stream, wherein said first audible label indicates said first emotional attribute;
applying, by said computing system, said first audible label to said first audible portion of said second audio data stream;
generating, by said computing system in response to said applying said first audible portion, a fourth audio data stream associated with said second audio data stream, wherein said fourth audio data stream comprises said second emotional attributes, said second audio data stream, and said first audible portion of said second audio data stream comprising said first audible label;
combining, by said computing system, said fourth audio data stream with said third audio data stream;
generating, by said computing system in response to said combining, a fifth audio data stream, wherein said fifth audio data stream comprises said fourth audio data stream and said third audio data stream; and
storing, by said computing system, said fifth audio data stream.

The present invention provides a method, comprising:
receiving, by a computing system, a first video data stream, wherein said first video data stream comprises first video data associated with a first person;
receiving, by said computing system, a second video data stream, wherein said second video data stream comprises second video data associated with a second person;
monitoring, by said computing system, said first video data stream and said second video data stream;
identifying, by said computing system in response to said monitoring said first video data stream, first emotional attributes comprised by said first video data;
generating, by said computing system in response to said identifying said first emotional attributes, a third video data stream associated with said first video data stream, wherein said third video data stream comprises third video data associated with said first person, and wherein said third video data does not comprise said first emotional attributes;
identifying, by said computing system in response to said monitoring said second video data stream, second emotional attributes comprised by said second video data;
identifying, by said computing system, a first emotional attribute of said second emotional attributes;
associating, by said computing system, a first visual object of said second video data stream with said first emotional attribute; and
generating, by said computing system, a first viewable label for said first visual object, wherein said first viewable label indicates said first emotional attribute;
applying, by said computing system, said first viewable label to said first visual object;
generating, by said computing system in response to said applying said first viewable label, a fourth video data stream associated with said second video data stream, wherein said fourth video data stream comprises second emotional attributes, said second video data, and said first visual object comprising said first viewable label;
first combining, by said computing system, said fourth video data stream with said third video data stream;
generating, by said computing system in response to said first combining, a fifth video data stream, wherein said fifth video data stream comprises said fourth video data stream and said third video data stream; and
storing, by said computing system, said fifth video data stream.

The present invention provides a method, comprising:
receiving, by a computing system, a first audio/video data stream;
extracting, by said computing system from said first audio/video data stream, a first audio/video data sub-stream and a second audio/video data sub-stream;
extracting, by said computing system from said first audio/video data sub-stream, a first video data stream and a first audio data stream, wherein said first video data stream comprises first video data associated with a first person, and wherein said first audio data stream comprises first speech data associated with said first person;
extracting, by said computing system from said second audio/video data sub-stream, a second video data stream and a second audio data stream, wherein said second video data stream comprises second video data associated with a second person, and wherein said second audio data stream comprises second speech data associated with said second person;

monitoring, by said computing system, said first video data stream and said second video data stream;

identifying, by said computing system in response to said monitoring said first video data stream, first emotional attributes comprised by said first video data;

generating, by said computing system in response to said identifying said first emotional attributes, a third video data stream associated with said first video data stream, wherein said third video data stream comprises third video data associated with said first person, and wherein said third video data does not comprise said first emotional attributes;

identifying, by said computing system in response to said monitoring said second video data stream, second emotional attributes comprised by said second video data;

identifying, by said computing system, a first emotional attribute of said second emotional attributes;

associating, by said computing system, a first visual object of said second video data stream with said first emotional attribute;

generating, by said computing system, a first viewable label for said first visual object, wherein said first viewable label indicates said first emotional attribute;

applying, by said computing system, said first viewable label to said first visual object;

generating, by said computing system in response to said applying said first viewable label, a fourth video data stream associated with said second video data stream, wherein said fourth video data stream comprises second emotional attributes, said second video data, and said first visual object comprising said first viewable label;

first combining, by said computing system, said fourth video data stream with said third video data stream;

generating, by said computing system in response to said first combining, a fifth video data stream, wherein said fifth video data stream comprises said fourth video data stream and said third video data stream; and storing, by said computing system, said fifth video data stream.

The present invention advantageously provides a system and associated method capable of modifying multiple data files.

DETAILED DESCRIPTION OF THE INVENTION

Figure 1:
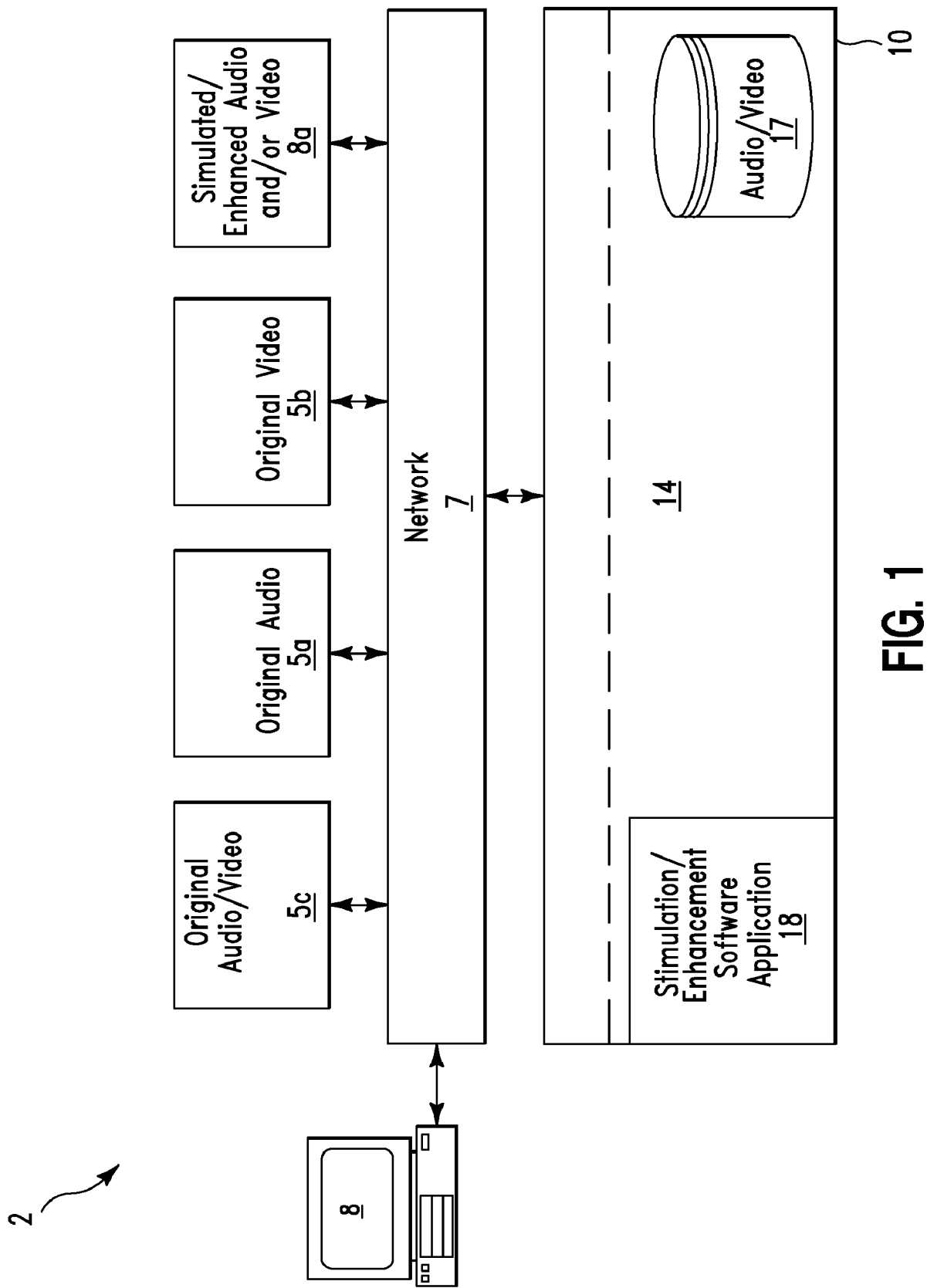
FIG. 1 illustrates a block diagram view of a system for simulating disabilities and/or enhancing audio/video data streams, in accordance with embodiments of the present invention.

FIG. 1 illustrates a block diagram view of a system 2 for simulating disabilities and/or enhancing audio/video data streams, in accordance with embodiments of the present invention. System 2 performs a process for:

1. Simulating an environment that a disabled person (e.g., an autistic person) perceives. The simulated environment is used by a person without a disability (e.g., product designers, parents, teachers, managers, etc) in order to increase awareness and sensitivities to people having disabilities. System 2 monitors and modifies inputted audio/video media (e.g., an audio/video data stream associated with, inter alia, a television show, a movie, a live event (e.g., a concert, a live speaker, etc.), etc. Audio and video media are independently modified to remove emotion cues and focus on given objects. System 2 monitors real-time events (e.g., movies, television shows, concerts, etc) and presents them in a modified manner on a visual display or in a virtual simulator. Real world audio and video media is obtained from external sensors such as microphones, cameras, and biometric sensors. Audio and video media from virtual simulators is interpreted directly via source code. System 2 identifies (e.g., by detecting specific facial expressions, by detecting specific vocal expressions, etc) and removes emotional events (e.g., by removing and replacing video comprising specific facial expressions, by removing and replacing specific vocal expressions, etc)) from audio and video media. As a first example, video data illustrating smiling faces may be modified or replaced to show neutral, expressionless faces. As a second example, audio data that comprises emotion (e.g., happy or sad voices, exited voices, etc) may be modified or replaced to sound monotone and expressionless. System 2 deconstructs real-time audio and video media and transforms it such that a viewer without a disability (e.g., a non-autistic person) may experience what a viewer with a disability (e.g., an autistic person) may perceive. The identification and removal of emotion from audio and video media may comprise a hybrid process that involves automatic and human editing. Alternatively, the identification and removal of emotion from audio and video media may comprise an automatic process. Additionally, system 2 may remove a focus on central objects (i.e., from video media). For example, an autistic person may have difficulty identifying a central or main object in a visual image and therefore system 2 may identifies the central object in the visual image and modifies the visual image such that it no longer appears as the central object. The central object may be identified by being the largest object in a display.

2. Aiding a disabled viewer (e.g., an autistic person) to view video media using visual cues. System 2 may add the visual cues to the video media thereby guiding a disabled person to help them notice moments of emotion and maintain focus.

The emotional cues identified by the system 2 are used to generate visual cues for disabled users. For example, if a person in video data is identified as having a happy smiling face and/or speaking in a happy tone, system 2 may generate a visual or audio cue (e.g., a red circle surrounding the person or a specified audible sound) at the moment of the emotional event. System 2 may be implemented in real-life settings through visual display, edited media (movies, television, radio, etc), in virtual simulations, etc.

System 2 of FIG. 1 comprises a computing apparatus 9, original audio file/streams 5a, original video file/streams 5b, original audio/video file/streams 5c, and simulated/enhanced audio and/or video file/streams 8a connected to a computing system 10 through a network 7. Network 7 may comprise any type of network including, inter alia, a local area network, (LAN), a wide area network (WAN), the Internet, etc. Original audio file/streams 5a, original video file/streams 5b, original audio/video file/streams 5c, and simulated/enhanced audio and/or video file/streams 8a may each be comprised by a computer, a database, a repository, etc. Computing apparatus 9 is used an administrator for helping to generate simulated/enhanced audio and/or video file/streams 8a. Computing apparatus 9 may comprise, inter alia, a personal computer, a laptop computer, a computer terminal, a telephone, etc. Computing apparatus 9 may comprise a single computing apparatus or a plurality of computing apparatuses. Computing system 10 may comprise any type of computing system(s) including, inter alia, a personal computer (PC), a server computer, a database computer, etc. Computing system 10 may comprise a single computing system or a plurality of computing systems. Computing system 10 comprises a memory system 14. Memory system 14 may comprise a single memory system. Alternatively, memory system 14 may comprise a plurality of memory systems. Memory system 14 may be internal to computing system (e.g., as illustrated in FIG. 1) or external to computing system 10. Memory system 14 comprises a simulation/enhancement software application 18 and repository 17. Repository 17 may be located internal to memory system 14 or external to memory system 14. Repository 17 may be a database. Repository 17 comprises audio/video data generated and/or synchronized by simulation/enhancement software application 18 (e.g., simulated/enhanced audio and/or video file/streams 8a). Simulation/enhancement software application 18 may comprise a plurality of software modules (as described with respect to FIG. 3, infra) for simulating disabilities and/or enhancing audio/video data streams.

Simulation/enhancement software application 18 allows for the following steps to be performed:
1. Computing system 10 receives information (i.e., original audio file/streams 5a, original video file/streams 5b, original audio/video file/streams 5c, and biometrics data).
2. Simulation/enhancement software application 18 transforms and optionally splits the information (i.e., original audio file/streams 5a, original video file/streams 5b, original audio/video file/streams 5c, and biometrics data) to generate a simulation comprising description as to how a person with a disability (e.g., autism) perceives their surroundings.
3. The simulation is presented to a viewer via an audio/video monitor. The viewer comprises a person with or without a disability.
4. The simulation or original input (i.e., original audio file/streams 5a, original video file/streams 5b, original audio/video file/streams 5c, and biometrics data) may additionally be modified in order to generate visual and audio modifications that enable a user with a disability to understand the simulation or original input. For example, information (e.g., visual or audio cues) may be added to the simulation or the original input to enable a user with a disability to follow the flow of any given event. The user with the disability will be able the simulation or the original input with enhanced marks or labels that illustrate emotions (i.e., as described with reference to FIG. 5).

Figure 2:
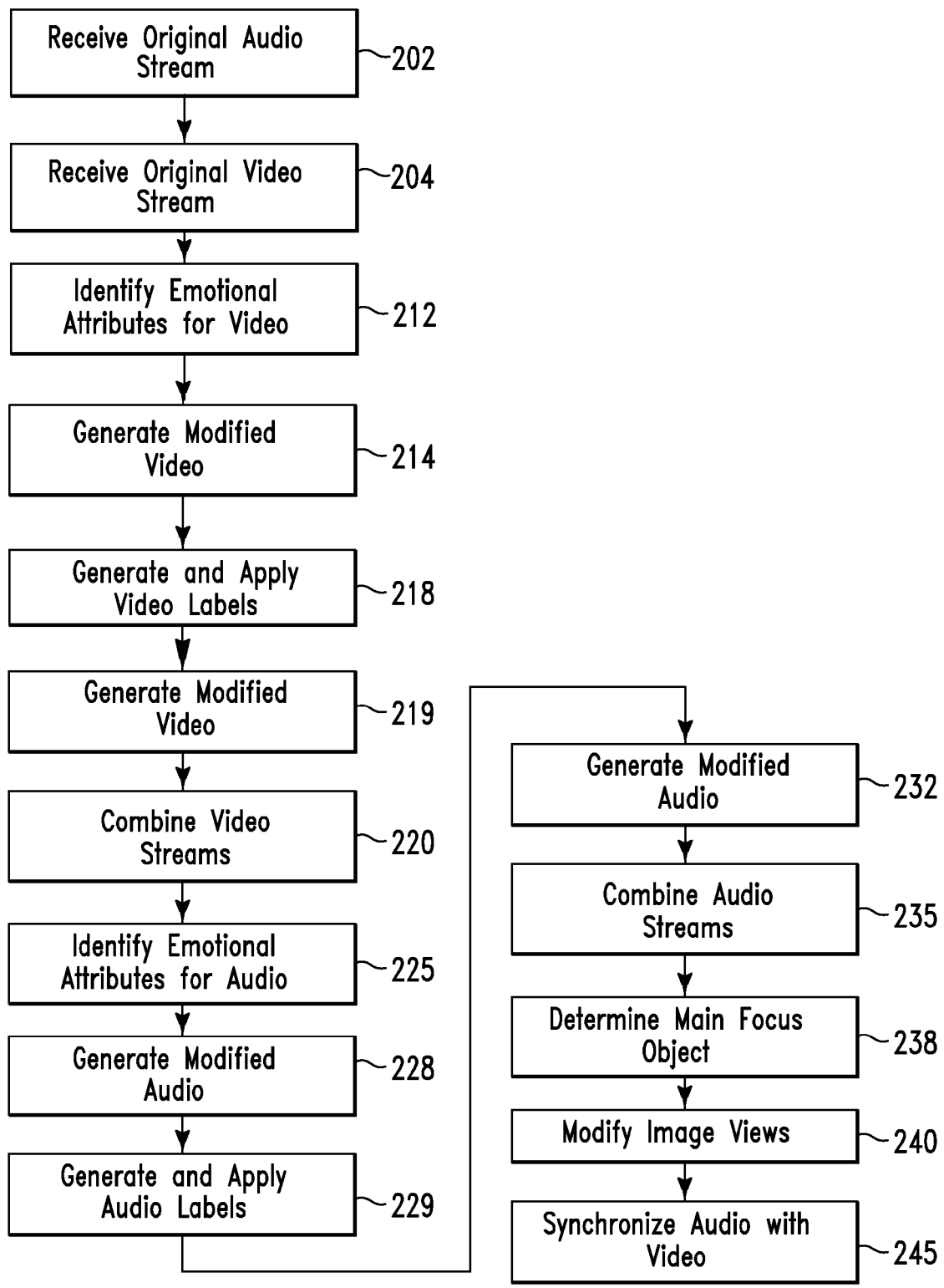
FIG. 2 illustrates an algorithm describing a process used by the system of FIG. 1 for simulating disabilities and/or enhancing individual audio/video data streams, in accordance with embodiments of the present invention.

FIG. 2 illustrates an algorithm describing a process used by system 2 of FIG. 1 for simulating disabilities and/or enhancing individual audio/video data streams, in accordance with embodiments of the present invention. In step 202, a computing system (e.g., computing system 10 in FIG. 1) receives first (original) audio file/streams (e.g., original audio file/streams 5a in FIG. 1). The first audio file/streams include a first audio file comprising first speech data associated with a first person and a second audio file comprising second speech data associated with a second person. In step 204, the computing system receives first video file/streams (e.g., original video file/streams 5b in FIG. 1). The first video file/streams include first video data associated with the first person and second video data associated with the second person. The first audio file/streams and the first video file/streams may be associated with, inter alia, a television show, a movie, a live event (e.g., a concert, a live speaker, etc.), etc. In step 208, the first video file/streams and the first audio file streams are monitored. In step 212, emotional attributes associated with the first video data and the second video data are identified (e.g., by detecting specific facial expressions, etc). In step 214, a first modified video file/stream associated with the first video data is generated. The first modified video file/stream comprises third video data associated with the first person. The first modified video file/stream does not comprise the emotional attributes associated with the first video data. In step 218, a first emotional attribute of the emotional attributes associated with the second video data is identified and associated with a visual object of the second video data. A viewable label indicating the first emotional attribute is generated and applied to the visual object. In step 219, a second modified video file/stream associated with the second video data is generated. The second modified video file/stream comprises the emotional attributes associated with the first video data and the visual object comprising the viewable label. In step 220, a combination video file stream is generated by combining the first modified video file/stream from step 214 and the second modified video file/stream from step 219. In step 225, emotional attributes associated with the first audio file and the second audio file are identified (e.g., by detecting specific vocal expressions, etc). In step 228, a first modified audio file associated with the first audio file is generated. The first modified audio file comprises the first speech data. The first modified audio file does not comprise the emotional attributes associated with the first audio file. In step 229, a second emotional attribute of the emotional attributes associated with the second audio file is identified and associated with an audible portion of the second audio file. An audible label indicating the second emotional attribute is generated and applied to the audible portion. In step 232, a second modified audio file associated with the second audio file is generated. The second modified audio file comprises the emotional attributes associated with the first audio file and the audible portion comprising the audible label. In step 235, a combination audio file is generated by combining the first modified audio file stream from step 228 and the second modified audio file from step 232. In (optional) step 238, the combination video file stream of step 220 is monitored and a main focus object and a background focus object are located and identified. The main focus objects may be identified by locating a largest object in an image and the background focus object may be identified by locating a smallest object in the image.

In (optional) step 240, the image views for the main focus object and the background focus object (e.g., a smallest object in the image) are modified (e.g., a size for the main focus object and a size for the background focus object may be reversed such that the main focus object appears smaller than the background focus object). In step 245, portions of the combination video file stream of step 220 are synchronized with associated portions of the combination audio file of step 235 and stored and/or broadcasted for a viewer.

Figure 3:
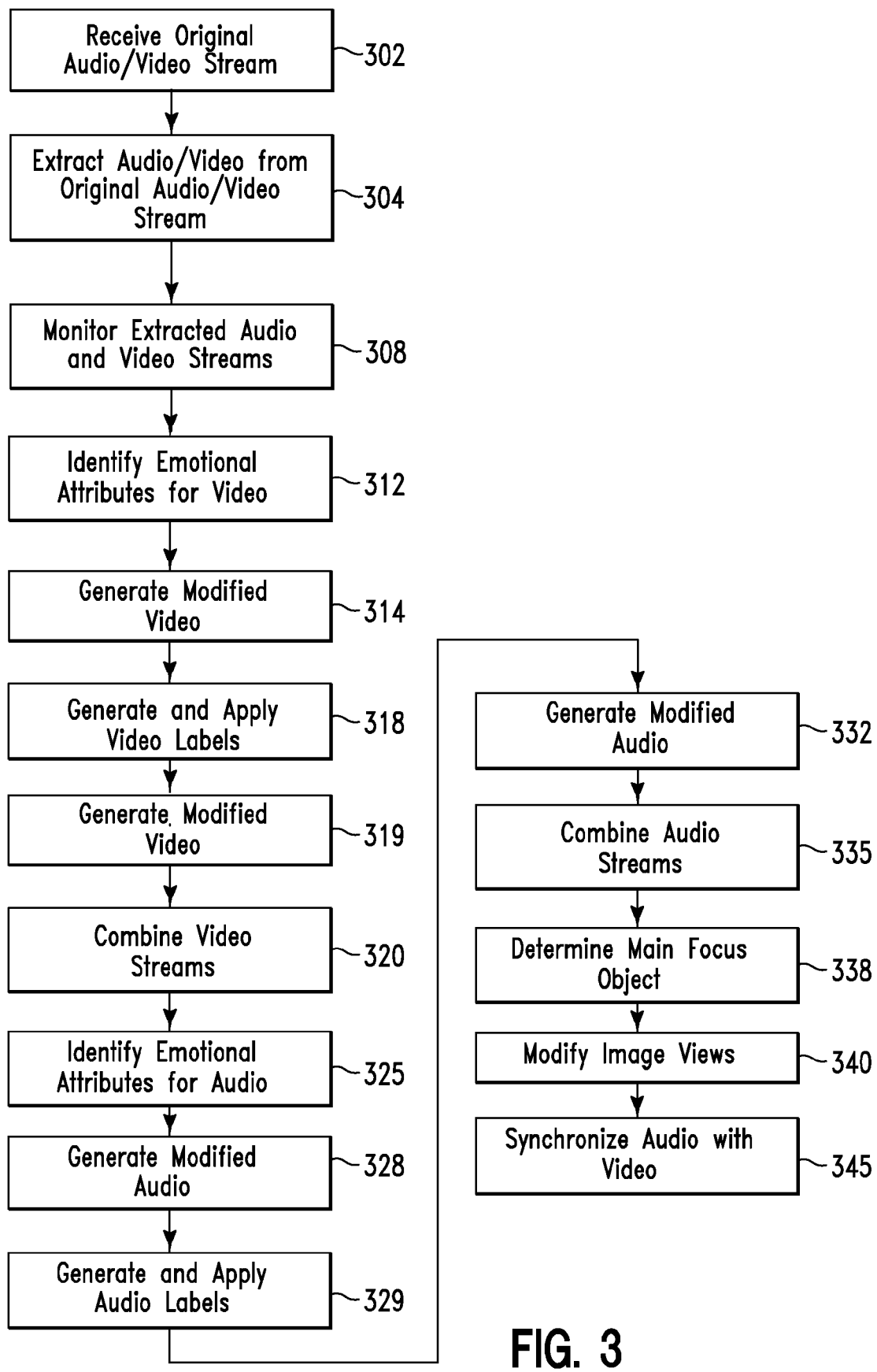
FIG. 3 illustrates an algorithm describing a process used by the system of FIG. 1 for simulating disabilities and/or enhancing combination audio/video data streams, in accordance with embodiments of the present invention.

FIG. 3 illustrates an algorithm describing a process used by system 2 of FIG. 1 for simulating disabilities and/or enhancing combination audio/video data streams, in accordance with embodiments of the present invention. In step 302, a computing system (e.g., computing system 10 in FIG. 1) receives a first (original) audio/video file/stream (e.g., original audio/video file/streams 5c in FIG. 1). In step 304, a first audio/video data sub-stream and a second audio/video data sub-stream is extracted from the first (original) audio/video file/stream. Additionally, first video data and a first audio file are extracted from the first audio/video data sub-stream and second video data and a second audio file are extracted from the second audio/video data sub-stream. The first audio file comprises first speech data associated with a first person and the second audio file comprises second speech data associated with a second person. The first video data is associated with the first person and the second video data is associated with the second person. In step 308, the first video data, the second video data, the first audio file, and the second audio file are all monitored. In step 312, emotional attributes associated with the first video data and the second video data are identified (e.g., by detecting specific facial expressions, etc). In step 314, a first modified video file/stream associated with the first video data is generated. The first modified video file/stream comprises third video data associated with the first person. The first modified video file/stream does not comprise the emotional attributes associated with the first video data. In step 318, a first emotional attribute of the emotional attributes associated with the second video data is identified and associated with a visual object of the second video data. A viewable label indicating the first emotional attribute is generated and applied to the visual object. In step 319, a second modified video file/stream associated with the second video data is generated. The second modified video file/stream comprises the emotional attributes associated with the first video data and the visual object comprising the viewable label. In step 320, a combination video file stream is generated by combining the first modified video file/stream from step 314 and the second modified video file/stream from step 319. In step 325, emotional attributes associated with the first audio file and the second audio file are identified (e.g., by detecting specific vocal expressions, etc). In step 328, a first modified audio file associated with the first audio file is generated. The first modified audio file comprises the first speech data. The first modified audio file does not comprise the emotional attributes associated with the first audio file. In step 329, a second emotional attribute of the emotional attributes associated with the second audio file is identified and associated with an audible portion of the second audio file. An audible label indicating the second emotional attribute is generated and applied to the audible portion. In step 332, a second modified audio file associated with the second audio file is generated. The second modified audio file comprises the emotional attributes associated with the first audio file and the audible portion comprising the audible label. In step 335, a combination audio file is generated by combining the first modified audio file stream from step 328 and the second modified audio file from step 332. In (optional) step 338, the combination video file stream of step 320 is monitored and a main focus object and a background focus object are located and identified. The main focus objects may be identified by locating a largest object in an image and the background focus object may be identified by locating a smallest object in the image. In (optional) step 340, the image views for the main focus object and the background focus object (e.g., a smallest object in the image) are modified (e.g., a size for the main focus object and a size for the background focus object may be reversed such that the main focus object appears smaller than the background focus object). In step 345, portions of the combination video file stream of step 320 are synchronized with associated portions of the combination audio file of step 335 and stored and/or broadcasted for a viewer.

Figure 4:
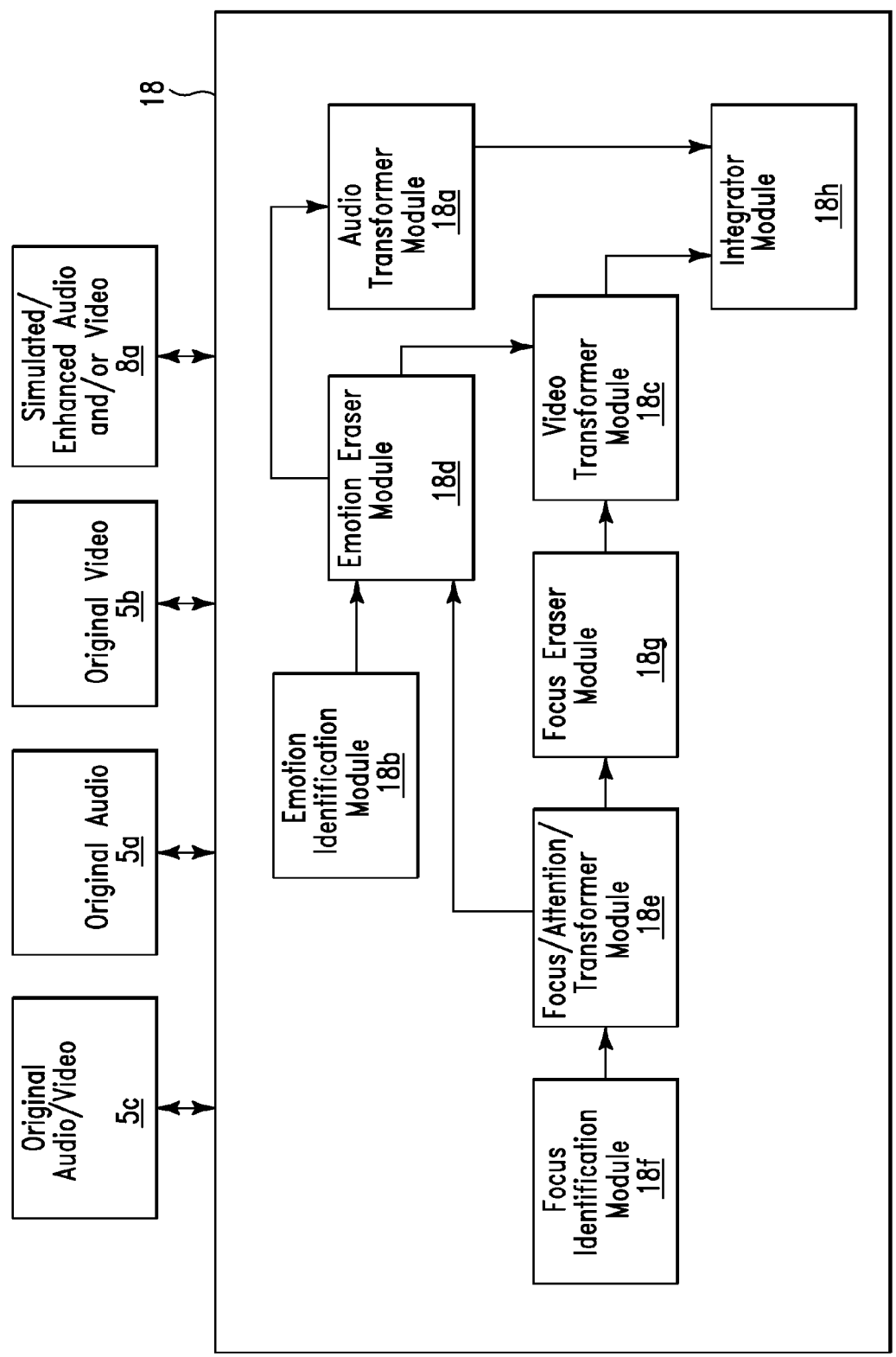
FIG. 4 illustrates a first internal block diagram view of the simulation/enhancement software application of FIG. 1, in accordance with embodiments of the present invention.

FIG. 4 illustrates a first internal block diagram view of simulation/enhancement software application 18, in accordance with embodiments of the present invention. Simulation/enhancement software application 18 comprises a plurality of software modules:

1. Audio transformer module 18a.
2. Emotion identification module 18b.
3. Video transformer module 18c.
4. Emotion eraser module 18d.
5. Focus/attention/transformer module 18e.
6. Focus identification module 18f.
7. Focus eraser module 18g.
8. Integrator module 18h.

Audio transformer module 18a converts an original audio file/stream (e.g., removes emotion events, adds audio cues, etc from original audio file/stream 5a or original audio/video file/stream 5c of FIG. 1) into simulated/enhanced/audio and/or video steams/files 8a (i.e., from FIG. 1). Video transformer module 18c converts an original video file/stream (e.g., removes emotion events, adds video cues or labels, modifies image/focus views, etc from original video file/stream 5b or original audio/video file/stream 5c of FIG. 1) into simulated/enhanced/audio and/or video steams/files 8a. Emotion identification module 18b identifies the emotion events from original audio file/stream 5a and original video file/stream 5b using biometric recognition systems. Emotion eraser module 18d removes the emotion events identified by emotion identification module 18b. Focus identification module 18f identifies a main focus object and a background focus object requiring modification so that that a video object (or an audio object) that is intended to be a center of attention becomes equivalent to a background video objects (or audio objects). For example, a main character speaking in a crowd or a specific car traveling on a highway may be modified to blend into background. The main focus objects may be identified by locating a largest object in an image and the background focus object may be identified by locating a smallest object in the image. Focus/attention/transformer module 18e uses focus identification data generated by focus identification module 18f to identify and change a portion of the video object (or audio object) that presents focal elements or cues. Focus eraser module 18g redistributes a size of the main focus objects (i.e., identified by focus identification module 18f) such that all objects of visual image or audio data have equal value. Integrator module 18h combines transformed audio (i.e., transformed by audio transformer module 18a, emotion identification module 18b, emotion eraser module 18d, focus/attention/transformer module 18e, focus identification module 18f, focus eraser module 18g, and integrator module 18h) with transformed video (i.e., transformed by video transformer module 18c, emotion identification module 18b, emotion eraser module 18d, focus/attention/transformer module 18e, focus identification module 18f, focus eraser module 18g, and integrator module 18h).

Figure 5:
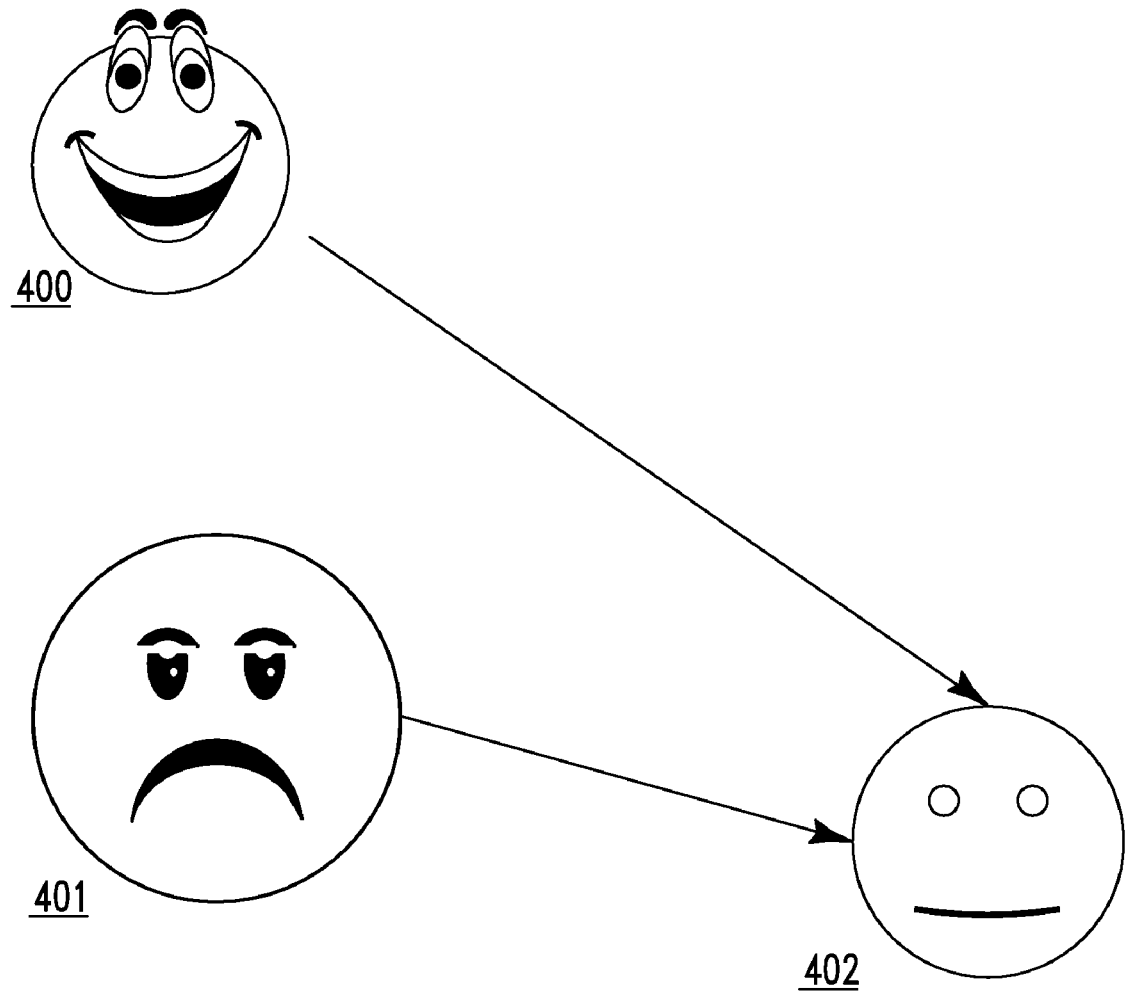
FIG. 5 is an implementation example illustrating the results of executing the emotion identification module and the emotion eraser module of FIG. 4, in accordance with embodiments of the present invention.

FIG. 5 is an implementation example illustrating the results of executing emotion identification module 18b and emotion eraser module 18d of FIG. 3, in accordance with embodiments of the present invention. Expression 400 illustrates a happy expression (i.e., a happy emotion). Expression 401 illustrates a sad expression (i.e., a sad emotion). Expression 402 illustrates a neutral expression (i.e., a neutral emotion). Expression 402 results from executing emotion eraser module 18d of FIG. 3 on expression 400 or 401.

Figure 6:
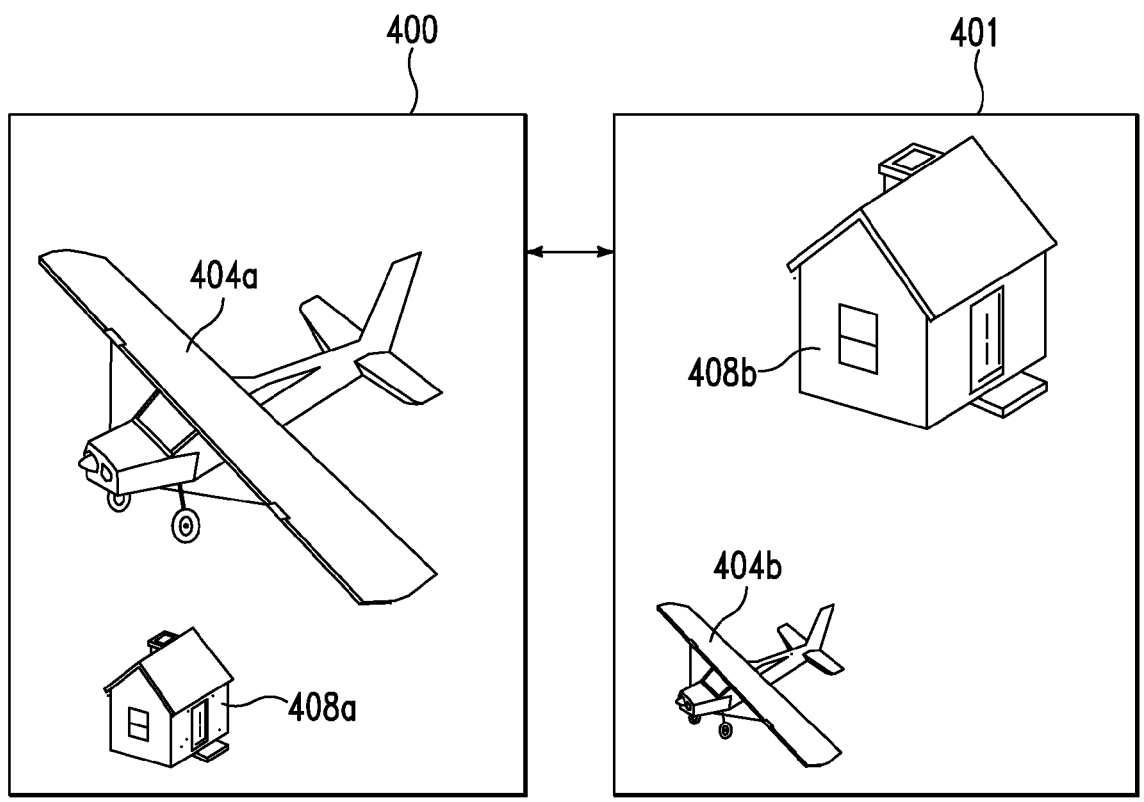
FIG. 6 is an implementation example illustrating the results of executing the focus/attention/transformer module, the focus identification module, and the focus eraser module of FIG. 4, in accordance with embodiments of the present invention.

FIG. 6 is an implementation example illustrating the results of executing focus/attention/transformer module 18e, focus identification module 18f, and focus eraser module 18g of FIG. 4, in accordance with embodiments of the present invention. FIG. 6 illustrates two examples for implementing focus/attention/transformer module 18e, focus identification module 18f, and focus eraser module 18g of FIG. 3.

EXAMPLE 1

Example 1 illustrates an embodiment associated with a disabled (e.g., autistic) viewer. In example 1, an original image 400 comprises an airplane 404a and a house 408a. House 408a in is a video object that is a main object (i.e., intended focus). Airplane 404a is a video object that is a background object. Modified image 401 (i.e., modified by focus/attention/transformer module 18e, focus identification module 18f, and focus eraser module 18g of FIG. 3) comprises an airplane 404b and a house 408b. House 408b has been enlarged in sized (i.e., from house 408a) to illustrate the main object (i.e., intended focus). Airplane 404b has been reduced in size (i.e., from airplane 404a) to illustrate the background object.

EXAMPLE 2

Example 2 illustrates an embodiment associated with a non-disabled viewer. Example 2 simulates (i.e., for a non-disabled viewer) an environment that a disabled person (e.g., autistic) perceives. In example 2, an original image 400 comprises an airplane 404a and a house 408a. House 408a in is a video object that is a background object. Airplane 404a is a video object that is a main object (i.e., intended focus). Modified image 401 (i.e., modified by focus/attention/transformer module 18e, focus identification module 18f, and focus eraser module 18g of FIG. 3) comprises an airplane 404b and a house 408b. House 408b has been enlarged in sized (i.e., from house 408a) to illustrate how difficult it is for a disabled viewer to identify a main object. For example, an autistic person may have difficulty identifying a central or main object in a visual image and therefore house 408b (background object) has been enlarged in size (i.e., from house 408a) to illustrate how difficult it is for a disabled viewer to identify a main object. Likewise, airplane 404b (i.e., main object) has been reduced in size (i.e., from airplane 404a).

Figure 7:
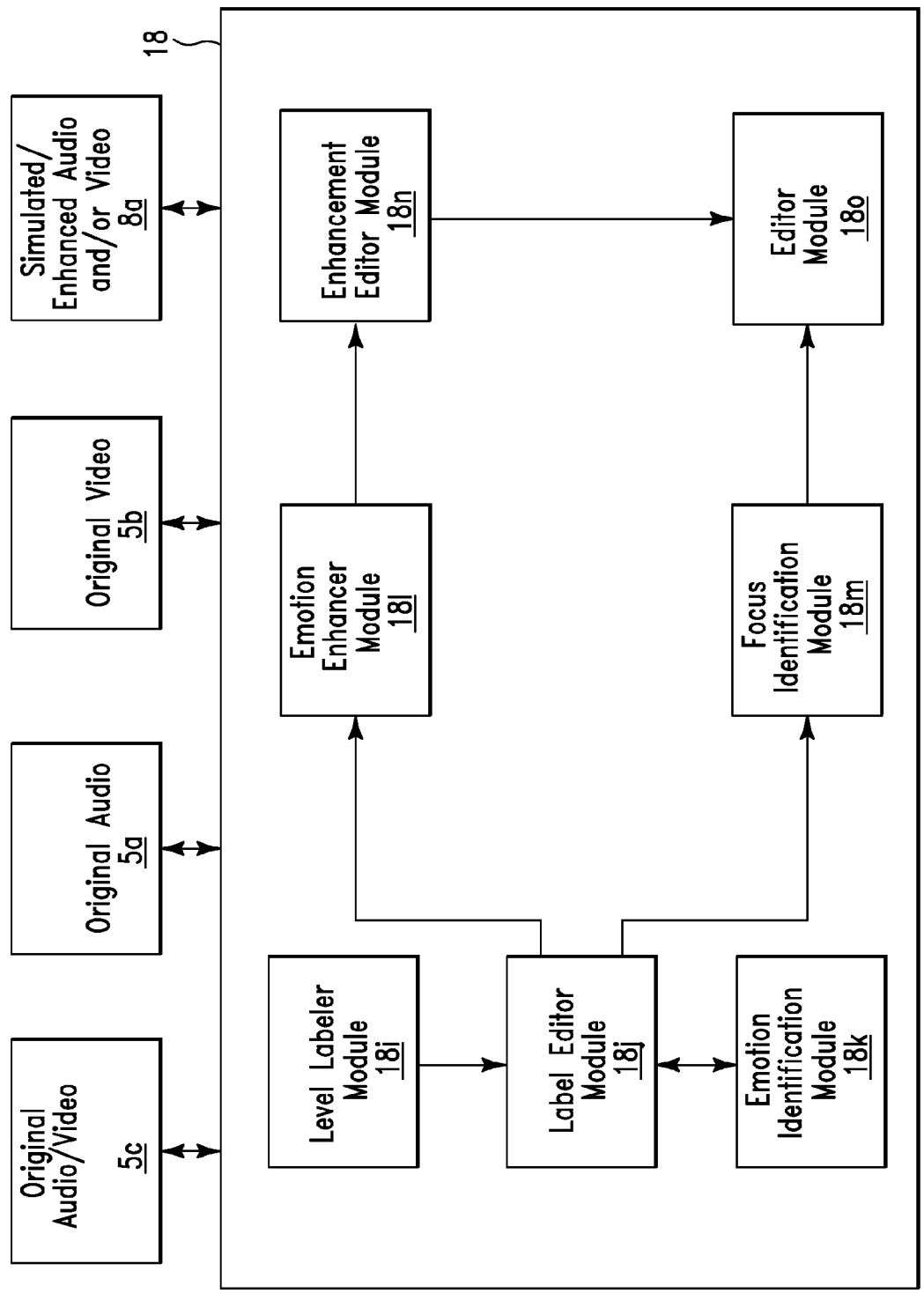
FIG. 7 illustrates a second internal block diagram view of the simulation/enhancement software application of FIG. 1, in accordance with embodiments of the present invention.

FIG. 7 illustrates a second internal block diagram view of simulation/enhancement software application 18, in accordance with embodiments of the present invention. Simulation/enhancement software application 18 comprises a plurality of software modules:
1. Level labeler module 18i.
2. Label editor module 18j.
3. Emotion identification module 18k.
4. Emotion enhancer module 18l.
5. Focus identification module 18m.
6. Enhancement editor module 18n.
7. Editor module 18o.

Audio and video objects for modification are identified and labeled by level labeler module 18i. Labeling may comprise identifying categories of the audio and video objects. For example, identifying a face, a car, a musical instrument, etc. Label editor module 18j is used to edit the labels generated by level labeler module 18i. Emotion identification module 18k performs a higher level labeling process. A higher level labeling process may include identifying emotion, and focal elements in the audio and video objects. Label editor module 18j may be used to edit the labels generated by emotion identification module 18k. Focus identification module 18m identifies areas of focus in audio and video objects. Editor module 18o edits the areas of focus identified by focus identification module 18m. Emotion enhancer module 18l identifies a given emotional event with a visual cue on a display. For example, if a person on the display illustrates a happy emotion, their face may be encircled with a red perimeter. Enhancement editor may be used to edit the emotional event identified by Emotion enhancer module 18l.

Figure 8:
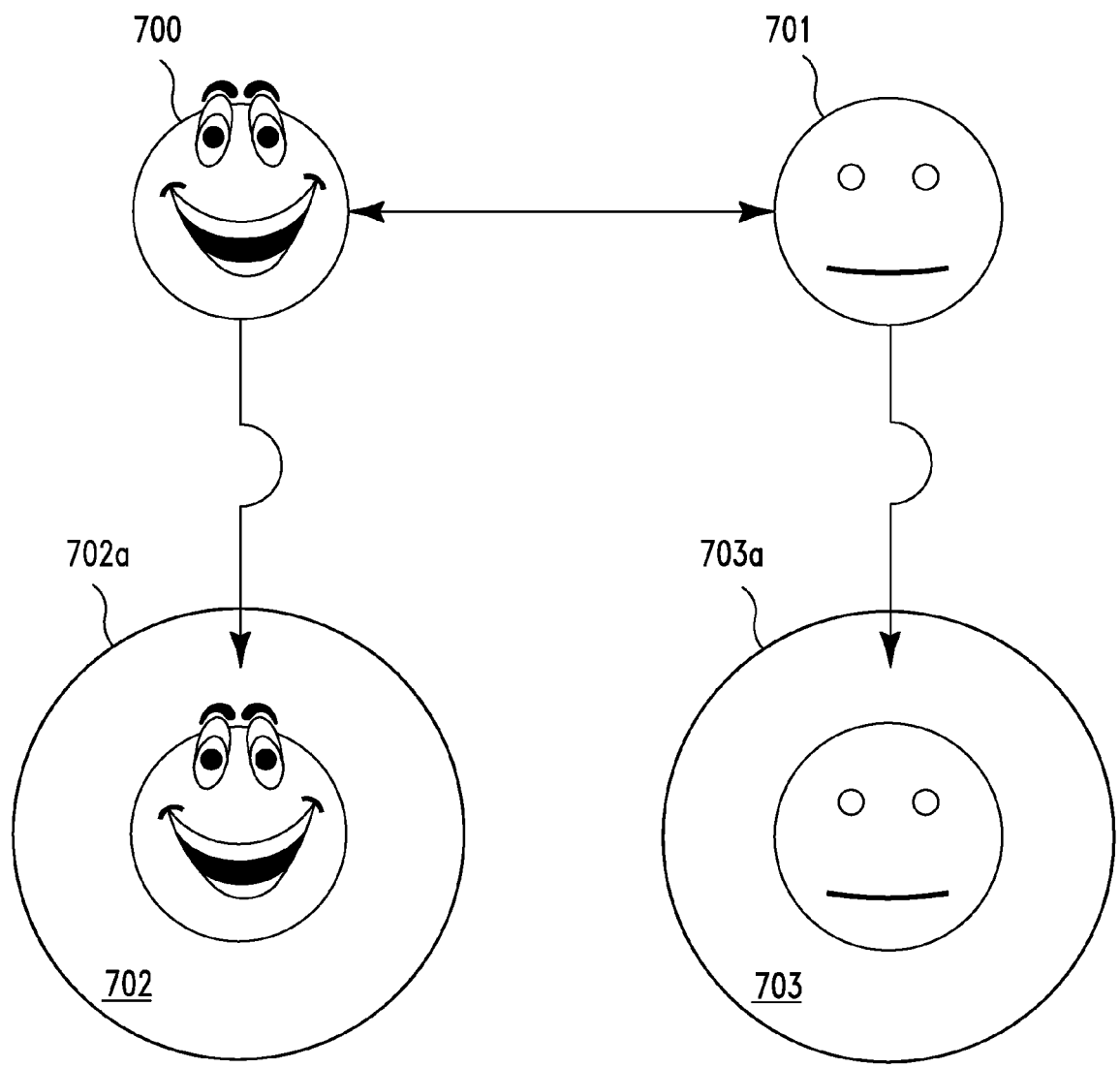
FIG. 8 is an implementation example illustrating the results of executing the emotion enhancer module of FIG. 7, in accordance with embodiments of the present invention.

FIG. 8 is an implementation example illustrating the results of executing emotion enhancer module 18l of FIG. 7, in accordance with embodiments of the present invention. Expression 700 illustrates a happy expression (i.e., a happy emotion). Expression 701 illustrates a neutral expression (i.e., a neutral emotion) converted from expression 700. Expression 702 illustrates a happy expression (i.e., a happy emotion) comprising an identifier 702a (i.e., a polygon perimeter) to help a disabled viewer recognize the happy expression. Expression 703 illustrates a neutral expression converted from expression 702 or 701. Expression 703 comprises an identifier 703a (i.e., a polygon perimeter) to help a disabled viewer recognize the happy expression.

Figure 9:
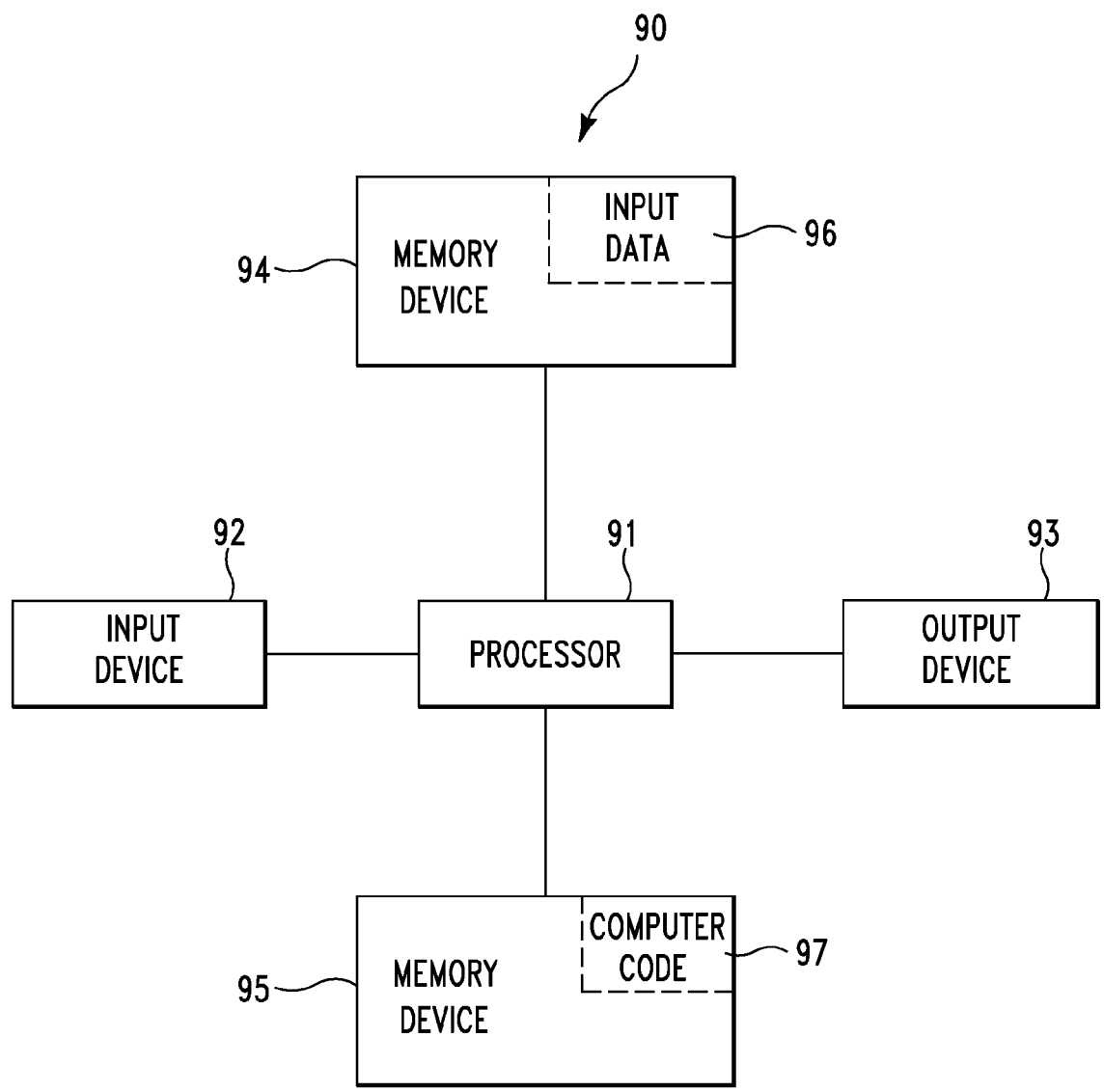
FIG. 9 illustrates a computer system used for simulating disabilities and/or enhancing audio/video data streams, in accordance with embodiments of the present invention.

FIG. 9 illustrates a computer system 90 used for simulating disabilities and/or enhancing audio/video data streams, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for simulating disabilities and/or enhancing audio/video data streams (e.g., the algorithms of FIGS. 2 and 3). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may comprise the algorithms of FIGS. 2 and 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to simulate disabilities and/or enhance audio/video data streams. Thus the present invention discloses a process for deploying or integrating computing infrastructure, comprising integrating computer-readable code into the computer system 90, wherein the code in combination with the computer system 90 is capable of performing a method for simulating disabilities and/or enhancing audio/video data streams. In another embodiment, the invention provides a business method that performs the process steps of the invention on a subscription, advertising, and/or fee basis. That is, a service provider, such as a Solution Integrator, could offer to simulate disabilities and/or enhance audio/video data streams. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 9 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving, by a computing system, a first video data stream, wherein said first video data stream comprises first video data associated with a first person;
   receiving, by said computing system, a second video data stream, wherein said second video data stream comprises second video data associated with a second person;
   monitoring, by said computing system, said first video data stream and said second video data stream;
   identifying, by said computing system in response to said monitoring said first video data stream, first emotional attributes comprised by said first video data;
   generating, by said computing system in response to said identifying said first emotional attributes, a third video data stream associated with said first video data stream, wherein said third video data stream comprises third video data associated with said first person, and wherein said third video data does not comprise said first emotional attributes;
   identifying, by said computing system in response to said monitoring said second video data stream, second emotional attributes comprised by said second video data;
   identifying, by said computing system, a first emotional attribute of said second emotional attributes;
   associating, by said computing system, a first visual object of said second video data stream with said first emotional attribute of said second emotional attributes; and
   generating, by said computing system, a first viewable label for said first visual object, wherein said first viewable label indicates said first emotional attribute of said second emotional attributes;
   applying, by said computing system, said first viewable label to said first visual object;
   generating, by said computing system in response to said applying said first viewable label, a fourth video data stream associated with said second video data stream, wherein said fourth video data stream comprises said second emotional attributes, said second video data, and said first visual object comprising said first viewable label;
   first combining, by said computing system, said fourth video data stream with said third video data stream;
   generating, by said computing system in response to said first combining, a fifth video data stream, wherein said fifth video data stream comprises said fourth video data stream and said third video data stream;
   storing, by said computing system, said fifth video data stream;
   receiving, by said computing system, a first audio data stream, wherein said first audio data stream comprises first speech data associated with said first person;
   receiving, by said computing system, a second audio data stream, wherein said second audio data stream comprises second speech data associated with said second person;
   monitoring, by said computing system, said first audio data stream and said second audio data stream;
   identifying, by said computing system in response to said monitoring said first audio data stream, third emotional attributes comprised by said first audio data stream;
   generating, by said computing system in response to said identifying said third emotional attributes, a third audio data stream associated with said first audio data stream, wherein said third audio data stream comprises said first speech data, and wherein said third audio data stream does not comprise said third emotional attributes;
   identifying, by said computing system in response to said monitoring said second audio data stream, fourth emotional attributes comprised by said second audio data stream;
   identifying, by said computing system, a second emotional attribute of said third emotional attributes;
   associating, by said computing system, a first audible portion of said second audio data stream with said second emotional attribute of said third emotional attributes;
   generating, by said computing system, a first audible label for said first audible portion of said second audio data stream, wherein said first audible label indicates said second emotional attribute of said third emotional attributes;
   applying, by said computing system, said first audible label to said first audible portion of said second audio data stream;
   generating, by said computing system in response to said applying said first audible portion, a fourth audio data stream associated with said second audio data stream, wherein said fourth audio data stream comprises said forth emotional attributes, said second audio data stream, and said first audible portion of said second audio data stream comprising said first audible label;
   second combining, by said computing system, said fourth audio data stream with said third audio data stream;
   generating, by said computing system in response to said second combining, a fifth audio data stream, wherein said fifth audio data stream comprises said fourth audio data stream and said third audio data stream; and
   storing, by said computing system, said fifth audio data stream.

2. The method of claim 1, further comprising:
synchronizing, by said computing system, portions of said fifth audio data stream with associated portions of said fifth video data stream;
generating, by said computing system in response to said synchronizing, a first audio/video data stream associated with said fifth audio data stream and said fifth video data stream; and
broadcasting, by said computing system, said first audio/video data stream.

3. The method of claim 1, further comprising:
enabling, by said computing system, said third video data stream;
monitoring, by said computing system, said third video data stream;
identifying, by said computing system in response to said monitoring said third video data stream, a first visual image of said third video data stream, wherein said first visual image comprises a second visual object and a third visual object, wherein said second visual object is an intended main viewing object of said first visual image, and wherein said third visual object is an intended background viewing object of said first visual image;
generating, by said computing system from said first visual image, a second visual image, wherein said second visual image comprises said second visual object and said third visual object, wherein said second visual object comprised by said second visual image is an intended background viewing object of said second visual image, and wherein said third visual object comprised by said second visual image is an intended main viewing object of said second visual image;
generating, by said computing system, a sixth video data stream, wherein said generating, said sixth video data stream comprises removing said first visual image from said second video data stream and placing said second visual image in said second video data stream; and
storing, by said computing system, said sixth video data stream.

4. The method of claim 3, further comprising:
generating, by said computing system, a second viewable label for said third visual object comprised by said second visual image, wherein said second viewable label indicates that said third visual object comprised by said second visual image is an intended main viewing object of said second visual image;
applying, by said computing system, said second viewable label to said third visual object comprised by said second visual image;
generating, by said computing system in response to said applying said second viewable label, a seventh video data stream associated with said sixth video data stream, wherein said seventh video data stream comprises said sixth video data stream and said third visual object comprising said second viewable label; and
storing, by said computing system, said seventh video data stream.

5. The method of claim 1, wherein said first emotional attributes comprise facial expressions of said first person, and wherein said second emotional attributes comprise facial expressions of said second person.

6. A computer program product, comprising a computer storage device storing a computer readable program code, said computer readable program code configured to perform the method of claim 1 upon being executed by a processor of a computing system.

7. A computing system comprising a processor coupled to a computer-readable memory unit, said memory unit comprising a computer readable code configured to be executed by the processor to perform the method of claim 1.

8. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

9. A method, comprising:
receiving, by a computing system, a first audio/video data stream;
extracting, by said computing system from said first audio/video data stream, a first audio/video data sub-stream and a second audio/video data sub-stream;
extracting, by said computing system from said first audio/video data sub-stream, a first video data stream and a first audio data stream, wherein said first video data stream comprises first video data associated with a first person, and wherein said first audio data stream comprises first speech data associated with said first person;
extracting, by said computing system from said second audio/video data sub-stream, a second video data stream and a second audio data stream, wherein said second video data stream comprises second video data associated with a second person, and wherein said second audio data stream comprises second speech data associated with said second person;
monitoring, by said computing system, said first video data stream and said second video data stream;
identifying, by said computing system in response to said monitoring said first video data stream, first emotional attributes comprised by said first video data;
generating, by said computing system in response to said identifying said first emotional attributes, a third video data stream associated with said first video data stream, wherein said third video data stream comprises third video data associated with said first person, and wherein said third video data does not comprise said first emotional attributes;
identifying, by said computing system in response to said monitoring said second video data stream, second emotional attributes comprised by said second video data;
identifying, by said computing system, a first emotional attribute of said second emotional attributes;
associating, by said computing system, a first visual object of said second video data stream with said first emotional attribute of said second emotional attributes;
generating, by said computing system, a first viewable label for said first visual object, wherein said first viewable label indicates said first emotional attribute of said second emotional attributes;
applying, by said computing system, said first viewable label to said first visual object;
generating, by said computing system in response to said applying said first viewable label, a fourth video data stream associated with said second video data stream, wherein said fourth video data stream comprises said second emotional attributes, said second video data, and said first visual object comprising said first viewable label;
first combining, by said computing system, said fourth video data stream with said third video data stream;
generating, by said computing system in response to said first combining, a fifth video data stream, wherein said fifth video data stream comprises said fourth video data stream and said third video data stream;

storing, by said computing system, said fifth video data stream;

monitoring, by said computing system, said first audio data stream and said second audio data stream;

identifying, by said computing system in response to said monitoring said first audio data stream, third emotional attributes comprised by said first audio data stream;

generating, by said computing system in response to said identifying said third emotional attributes, a third audio data stream associated with said first audio data stream, wherein said third audio data stream comprises said first speech data, and wherein said third audio data stream does not comprise said third emotional attributes;

identifying, by said computing system in response to said monitoring said second audio data stream, fourth emotional attributes comprised by said second audio data stream;

identifying, by said computing system, a second emotional attribute of said third emotional attributes;

associating, by said computing system, a first audible portion of said second audio data stream with said second emotional attribute of said third emotional attributes;

generating, by said computing system, a first audible label for said first audible portion of said second audio data stream, wherein said first audible label indicates said second emotional attribute of said third emotional attributes;

applying, by said computing system, said first audible label to said first audible portion of said second audio data stream;

generating, by said computing system in response to said applying said first audible portion, a fourth audio data stream associated with said second audio data stream, wherein said fourth audio data stream comprises said forth emotional attributes, said second audio data stream, and said first audible portion of said second audio data stream comprising said first audible label;

second combining, by said computing system, said fourth audio data stream with said third audio data stream;

generating, by said computing system in response to said second combining, a fifth audio data stream, wherein said fifth audio data stream comprises said fourth audio data stream and said third audio data stream; and storing, by said computing system, said fifth audio data stream.

10. The method of claim 9, further comprising:

synchronizing, by said computing system, portions of said fifth audio data stream with associated portions of said fifth video data stream;

generating, by said computing system in response to said synchronizing, a second audio/video data stream associated with said fifth audio data stream and said fifth video data stream; and broadcasting, by said computing system, said second audio/video data stream.

11. A computer program product, comprising a computer storage device storing a computer readable program code, said computer readable program code configured to perform the method of claim 9 upon being executed by a processor of a computing system.

12. A computing system comprising a processor coupled to a computer-readable memory unit, said memory unit comprising a computer readable code configured to be executed by the processor to perform the method of claim 9.

13. A process for supporting computer infrastructure, said process comprising providing at least one support service for at least one of creating, integrating, hosting, maintaining, and deploying computer-readable code in a computing system, wherein the code in combination with the computing system is capable of performing the method of claim 9.

* * * * *